(12) United States Patent
Ethington

(10) Patent No.: US 8,621,287 B1
(45) Date of Patent: Dec. 31, 2013

(54) COMPUTING SYSTEM MONITORING

(75) Inventor: Seth E. Ethington, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 438 days.

(21) Appl. No.: 12/939,016

(22) Filed: Nov. 3, 2010

(51) Int. Cl. *G06F 11/00* (2006.01)

(52) U.S. Cl. USPC ............... 714/57; 714/25; 714/45; 714/48

(58) Field of Classification Search USPC ............................................. 714/57 See application file for complete search history.

(56) References Cited

U.S. PATENT DOCUMENTS

| | | | |
|---|---|---|---|
| 5,801,707 A | 9/1998 | Rolnik et al. | |
| 6,154,212 A | 11/2000 | Eick et al. | |
| 2006/0293940 A1* | 12/2006 | Tsyganskiy et al. | 705/8 |
| 2007/0171716 A1 | 7/2007 | Wright et al. | |
| 2007/0208840 A1 | 9/2007 | McConville et al. | |
| 2007/0220174 A1 | 9/2007 | Abhyanker | |
| 2008/0276137 A1* | 11/2008 | Lin et al. | 714/57 |
| 2009/0319832 A1* | 12/2009 | Zhang et al. | 714/38 |
| 2010/0138694 A1* | 6/2010 | Harrison et al. | 714/26 |
| 2010/0145731 A1* | 6/2010 | Benja-Athon | 705/3 |
| 2011/0191138 A1* | 8/2011 | Saraf | 705/7.28 |

OTHER PUBLICATIONS

Bosca, Alessio, "OntoSphere: more than a 3D ontology visualization tool" [Retreived on Mar. 29, 2010], Retrieved from the Internet <URL: http://citeseerx.ist.psu.edu/viewdoc/download?doi=10.1.1.62.8462&rep=rep1&type=pdf>; 15 pgs.

* cited by examiner

*Primary Examiner* — Sarai Butler
(74) *Attorney, Agent, or Firm* — Brooks, Cameron & Huebsch, PLLC (57) ABSTRACT

The present disclosure provides apparatus, systems, and methods for computing system monitoring. The apparatus, systems, and methods provide a map that indicates a location of a system problem within the computing system.

20 Claims, 4 Drawing Sheets

COMPUTING SYSTEM MONITORING

FIELD OF DISCLOSURE

The present disclosure relates to computing system monitoring, and particularly to apparatus, systems, and methods that provide a map that indicates a location of a system problem within the computing system.

BACKGROUND

Systems may be large and complex and include many system components. System components may include switches, bridges, routers, computers, printers, servers, databases, and networks and such systems may be used to move and to store information. Some system applications include electronic mail, transaction processing, remote database, query, processing, and file transfer.

System problems may occur during operation of the system such as overloaded system components, crashed system components, lost network connections, virus or malware infections, and power outages, introduction of defective code, among others. Accordingly, an organization that utilizes such systems may be adversely effected when a system problem occurs. Adverse affects may, for example, be incorrect or missing data, unavailability of a portion or a system as a whole, unexecutable application programs, downtime associated with finding and fixing the problems, the generation of other problems based upon the original problem, and/or other issues.

DETAILED DESCRIPTION

The present disclosure provides apparatus, systems, and methods for computing system monitoring. These apparatus, systems, and methods provide a visual representation, e.g. a map, of a computing system, computing system components, and/or system problems.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process and/or structural changes may be made without departing from the scope of the present disclosure.

It will be understood that the computing systems and the computing system components of the present disclosure, as generally described and illustrated in the figures herein, may be arranged and designed in a wide variety of different configurations. Thus, the following description of the present disclosure is not intended to limit the scope of the disclosure, but is representative of one or more embodiments of the disclosure.

The present disclosure provides for computing system monitoring. Computing systems are made up of integrated components that perform functions. Examples of the functions performed by computing systems include, but are not limited to, accounting, production scheduling, customer information management, human capital management, and transactions. Computing systems may utilize servers and may simultaneously provide services to a small or large number of users, for example, via one or more computing devices or computer networks.

The computing system may be an enterprise computing system. In some embodiments, the enterprise computing system may be a system that is central to an organization, here being the enterprise, and may provide that information may be shared across some or all functional levels and/or management hierarchies of the organization, rather than a single department or group within the organization. The organization may be a provider, such that the organization provides services to a customer.

Figure 1:
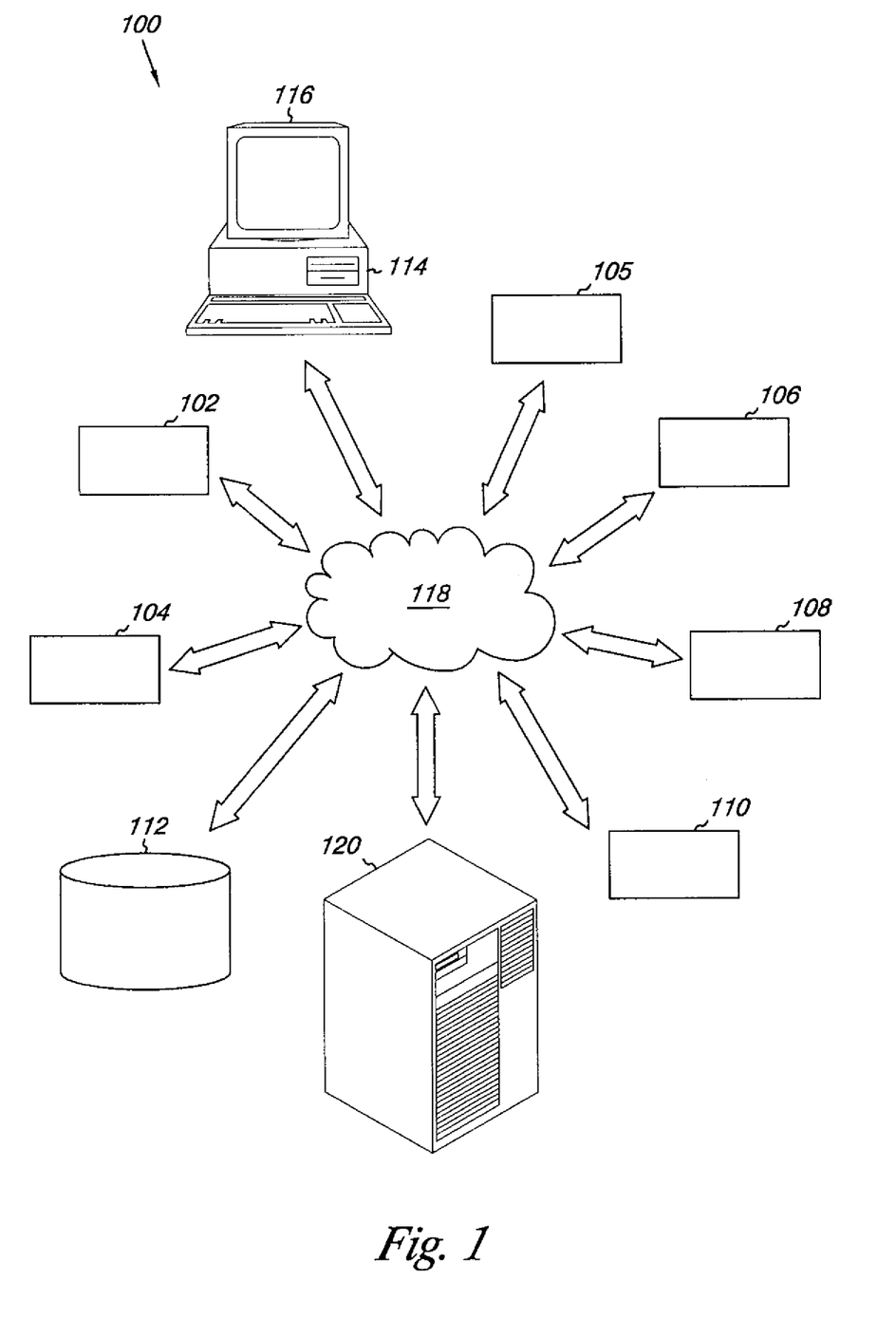
FIG. 1 illustrates a computing system and computing system components thereof.

FIG. 1 illustrates computing system 100 including a number of computing system components. Embodiments of the present disclosure are not limited to the computing system components illustrated in FIG. 1.

In the embodiment illustrated in FIG. 1, the computing system 100 includes a number of computing system components and functionalities, such as: detecting executable instructions 102, logging executable instructions 104, analyzing executable instructions 106, mapping executable instructions 108, integrating executable instructions 110, database 112, computing device 114, graphical user interface (GUI) 116, network 118, and server 120. Computing system components may communicate with other computing system components via network 118 and/or directly.

For example, a computing system component may communicate with another computing system component via a communication channel. In some embodiments, one or more of the functionalities: detecting executable instructions 102, logging executable instructions 104, analyzing executable instructions 106, mapping executable instructions 108, and integrating executable instructions 110 may be present on computing device 114.

Embodiments of the present disclosure, computing system monitoring, as disclosed herein, may detect one or more types of system problems. For example, as illustrated in the embodiment of FIG. 1, a computing system 100 may include the functionality of detecting executable instructions 102.

In such an embodiment, the system 100 includes a mechanism (e.g. executable instructions) for detecting executable instructions, for detecting executable instructions 102 that detects executable instructions and/or hardware that indicate that a system problem, associated with the computing system 100, may be occurring. Examples of system problems include, but are not limited to, traffic problems, capacity violations, response time problems, security violations, batch job failures, invalid response, and errors such as network administration errors, data calculation errors, software implementation errors, and the like.

In various embodiments, such as that shown in FIG. 1, computing system 100 may include a mechanism (e.g. executable instructions) for logging executable instructions 104. Logging executable instructions 104 may, for instance, be utilized to log system problems that are detected via the mechanism for detecting executable instructions 102. For example, when detecting executable instructions functionality 102 has detected a system problem, the logging executable instructions functionality 104 may log the system problem as an error message. The error message may be stored, for example, in database 112.

Computing system 100 may also include a mechanism (e.g., executable instructions) for analyzing executable instructions 106, in some embodiments. In such embodiments, the analyzing executable instructions functionality 106 may be utilized to analyze system problems that are detected by the detecting executable instructions functionality 102 and, in some embodiments, logged by logging executable instructions functionality 104. Examples of analyses include, but are not limited to, stack trace and location. The results of the analysis may be stored, for example, in database 112.

A computing system 100 may include a mechanism (e.g., executable instructions) for mapping executable instructions 108, in some embodiments. In such embodiments, mapping executable instructions functionality 108 may be utilized to provide a map of the computing system 100 and/or one or more computing system components thereof. The map may provide the location of the system problem that has been detected, logged, and/or analyzed.

For example, in various embodiments, the computing system 100 may include a dynamic mapping engine 105 that is configured to create the map of the computing system 100 and/or one or more computing system components thereof. Examples of the map include, but are not limited to, raster maps and vector maps.

The raster maps may include a two-dimensional array, e.g., rows and columns, of colored pixels that form the map. The vector maps may include a collection of stored data.

The stored data may define locations of nodes and/or line segments, e.g., straight or curved, interconnecting the nodes. The stored data defining the vector map may represent information in the form of collections of points, e.g., the nodes, and line segments interconnecting the nodes to form polygons, i.e., closed figures comprised of line-interconnected nodes.

These points, lines, and polygons may have additional information associated with them. For example, the stored data may indicate that a particular point or node is the location of the computing system 100 and/or one or more computing system components thereof. The raster map and/or the vector map may include a number of formats, including but not limited to JPEG, PGN, EPS, SVG, X3D and combinations thereof.

The dynamic mapping engine 105 may have rules that govern the generation of the dynamic maps. These rules, for example, can include but are not limited to, standards such as Unified Modeling Language (UML), Systems Modeling Language (SysML), Generative Modeling Language (GML), and the combinations thereof.

The map of the computing system 100 may, for example, be displayed on computing device 114 via GUI 116. An example of an application that may be modified to create the mapping executable instructions functionality 102 is, but is not limited to, Google Maps 2D/3D application programming interface (API), Bing Maps 2D/3D application programming interface (API).

The raster map and/or the vector map may be used by the mapping executable instructions functionality 102 to provide a dynamic update. For example, mapping executable instructions functionality 102 may utilize the raster map and/or the vector map to provide real-time updates. It is conceivable that such an API could be modified to be suitable for some embodiments of the present disclosure.

In various embodiments, a database can be used in forming the map layout and/or contents of the map. For example, one suitable type of database is a configuration management database (CMDB) which could provide information utilized for auto generating a map. One benefit of using a CMDB is its ability to automatically discover information about configuration items (e.g., auto-discovery) and track changes as they happen. This can be useful in implementing a dynamic, real-time mapping of configuration items.

Using a CMDB can also allow the system to have a reporting component (e.g., database or portion thereof) for storing metadata about the system. This metadata can include, for example, information that can be used to generate reports in regard to the amount of use, response times, what errors exhausted their thresholds and for how long before they were exhausted, what errors flagged the most, and other such information that can be obtained from the database.

In various embodiments, the computing system 100 may include a mechanism (e.g., executable instructions) for integrating executable instructions 110. In such embodiments, the integrating executable instructions functionality 110 may be utilized to integrate mapping executable instructions functionality 108 with one or more other executable instructions and/or databases. For example, in one or more embodiments, the integrating executable instructions functionality 110 may be utilized to integrate the mapping executable instructions functionality 108 with database 112 to provide a map of computing system 100 that indicates a system problem has been detected via the detecting executable instructions functionality 102 and indicates which computing system components are affected by the system problem, for example via the analyzing executable instructions functionality 106.

A computing system, such as system 100, may include a computing device 114, as discussed herein. The computing device 114 is a device capable of processing, executing, and/or otherwise handling information. Examples of suitable computing devices include, but are not limited to, a server computer, a personal computer (e.g. a desktop computer or a portable computer such as, for example, a laptop or notebook computer), or a handheld computing device.

In the embodiment of FIG. 1, the computing system 100 includes a GUI 116. The GUI 116 may be part of or connected directly or indirectly to the computing device 114. The map of computing system 100 and/or computing system components thereof may be provided on GUI 116.

GUI 116 enables switching between a plurality of different yet related views, each showing information related to computing system 100 and/or computing system components thereof. For example, GUI 116 may provide a map of a portion of computing system 100. The information may be physical connections, logical connections, and/or groupings of the computing system components.

The information may provide an indication that is a result of monitoring computing system 100, as discussed herein. GUI 116 may be displayed as two dimensional and/or GUI 116 may be displayed as three dimensional as will be discussed with respect to FIGS. 3 and 4 below.

GUI 116 can, for example, allow a user to zoom to change a level of detail being displayed, or pan to change an area of the map of computing system 100 being viewed. GUI 116 may include a first level view that displays the computing system components of computing system 100 and provides information about the computing system components.

For example, GUI 116 may include a diagram, e.g. a map, of the system components of computing system 100. In some embodiments, the diagram can be a list view of all of the computing system components of computing system 100.

Examples of the diagram include, but are not limited to, class diagrams, component diagrams, relationship diagrams, composite structure diagrams, deployment diagrams, object diagrams, package diagrams, and/or profile diagrams.

The diagram and/or the map may be presented in a static view, where a static structure of computing system 100 is emphasized by using objects, attributes, operations, and/or relationships of computing system components. In some embodiments, a diagram map may be presented in a dynamic view, where a dynamic behavior of computing system 100 is emphasized by showing collaborations among objects and/or changes to the internal states of objects. The dynamic view may be updated periodically or in real time.

GUI 116 may utilize a modeling language, and therefore, the diagram may utilize a modeling language. An example of the modeling language includes, but is not limited to, Unified Modeling Language (UML).

In some embodiments, GUI 116 may include one or more search functions that allow a user to search computing system 100. Examples of the search include, but are not limited to, search by name, search by function, and/or search by location.

GUI 116 may include a second level view that displays a particular computing system component of computing system 100 and provides information about that computing system component, such as that the computing system component is the source of a system problem. Additionally, GUI 116 may zoom down to a third level view that provides information about a functional unit of a particular computing system component.

For example, for one or more embodiments, GUI 116 may provide information at a programming code level view of a particular computing system component. The programming code level view may provide programming code level information, e.g. indicate that a section of programming code is and/or is suspected as being responsible for a system problem.

The programming code level view may indicate that another section of code is responsible for a system problem. While three level views are discussed herein it is not intended that embodiments of the present disclosure be limited to three level views.

Embodiments of the present disclosure may include a varying number of level views, where each level view has a differing zoom factor as regarding computing system 100 and/or the computing system components thereof. Any level view may contain information about a system problem that may be helpful to the user include, but not limited to, graphs, statistics, mitigation plan, outage documentation, current outages, and the like.

A menu-driven system or a set of predefined zoom level buttons may be provided to select and/or switch between the level views. A viewer in GUI 116 may permit a user to view multiple connected schematics, or to view a layer hierarchy, as well as to move in a page-by-page view along the larger schematic view (which generally may not be viewed in its entirety within the viewer), with page-to-page interconnects.

In some level views only a portion of a total viewable level view, may be displayed via GUI 116. Therefore, in an embodiment, GUI 116 may provide switching between the level views in a way that provides information, such as computing system relations. The computing system relations may indicate which computer system components may be affected by a system problem. This may provide a substantially seamless means for looking at the computing system in its fullness and in real-time.

The term zoom is used herein to represent a GUI 116 in which a user may change the magnification of a level view. The change may scale existing graphics and/or change graphics in response to crossing a zoom boundary to reveal a different level view.

The zoomable GUI 116 may provide level views that are intermediate to other hierarchical or logical level views, providing enhanced flexibility and functionality in the display of information. For one or more embodiments, additional information is provided to a user via zooming from a level view to another level view.

For one or more embodiments, a display of the entire computing system 100 is provided on a single screen. It is then possible to zoom in to the detail of each computing system component and/or functional units thereof. In various embodiments, the additional information may be updated periodically or in real time.

In some embodiments, one or more graphics may change depending on the zoom level. For one or more embodiments, there is provided the ability to scale the display without changing the graphics.

For one or more embodiments the map is a vector map, e.g. geographic information system (GIS) data about Earth at various levels of detail. In various embodiments, the vector map may be desirable as it may provide high resolution, royalty free data/structure, and/or editability.

For one or more embodiments, GUI 116 is pannable. Panning enables a user to transition from a level view of a first portion of computing system 100 to a level view of a second portion of computing system 100. This feature may also allow a user to follow/trace a problem through the network even if the entire network is too large to be seen on the display of the GUI at once.

In some embodiments, the GUI (e.g., GUI 116) can be collapsible/expandable. In this manner, a user can reduce or expand the amount of information that can be provided about a particular element in the system. In some embodiments, elements can be grouped together and the information about them can then be collapsed/expanded. For example, an application could be in a group and that application could be selected and information/relationships regarding that application and its group members could be hidden or exposed.

The information provided via GUI 116 may include a status indicator. The status indicator may indicate the status of computing system 100, a computing system component, and or a functional unit. For example, the status indication may indicate that computing system 100, a computing system component, and/or a functional unit is functioning properly or that computing system 100, a computing system component, and/or functional unit is functioning improperly. The status indicator may be updated periodically or in real time.

In some embodiments, the status indicator may indicate computing system 100, a computing system component, and or a functional unit is associated with a system problem. In various embodiments, the status indicator may indicate the computing system 100, a computing system component, and or a functional unit is the cause of a system problem. In some embodiments, the status indicator may provide an actual value of a parameter associated with computing system 100 and/or computing system components thereof. The status indicator may provide an indication as to whether computing system 100 and/or a computing system component thereof is less than, equal to, or greater than a particular threshold value with regard to whether it may be having a system problem.

The status indicator may display different computing system components and/or functional units in different colors that are associated with differing statuses, in some embodiments. For example, GUI 116 may display information as a heat map where green indicates a problem free status, yellow indicates a status associated with a potential system problem, and red indicates a status having a system problem. In various embodiments, the status indicator may utilize other colors and/or indications including, but not limited to, flashing, bolding, markers, and/or pins.

In some embodiments, the status indicator may indicate a change in computing system 100, a computing system component, and/or a functional unit that has occurred. For example, the status indicator may indicate that a portion or programming code has changed, in relation to a prior state of that portion of programming code.

Computing system 100 may include network connection 118. Examples of network connections 118 include, but are not limited to a local area network (LAN) and a wide area network (WAN). Network 118 may be an intranet or the Internet.

Computing device 114 may be connected to the LAN through a network interface or a LAN adapter. Computing device 114 may include a modem or other means for establishing communications over the WAN, such as the interne. Computing system 100 may be connected together by wired and/or wireless systems, by local networks and/or widely distributed networks.

Many networks are coupled to the Internet, which provides an infrastructure for widely distributed computing and encompasses many different networks. Any such infrastructure, whether coupled to the Internet or not, may be used in conjunction with the present disclosure. It is appreciated that the network connections discussed are only for example, and other means of establishing a communications link between computing system components may be used.

Computing system 100 may include correlating executable instructions. The correlating executable instructions may be utilized to identify a relationship between a first system problem and a second system problem. For example, the correlating executable instructions functionality may identify a commonality between the first system problem and the second system problem.

The relationship identified by the correlating executable instructions may be provided to a user via the GUI. For example, the correlating executable instructions functionality may indicate that the first system problem is a cause of the second system problem such that remedying the first system problem would remedy the second system problem.

Figure 2:
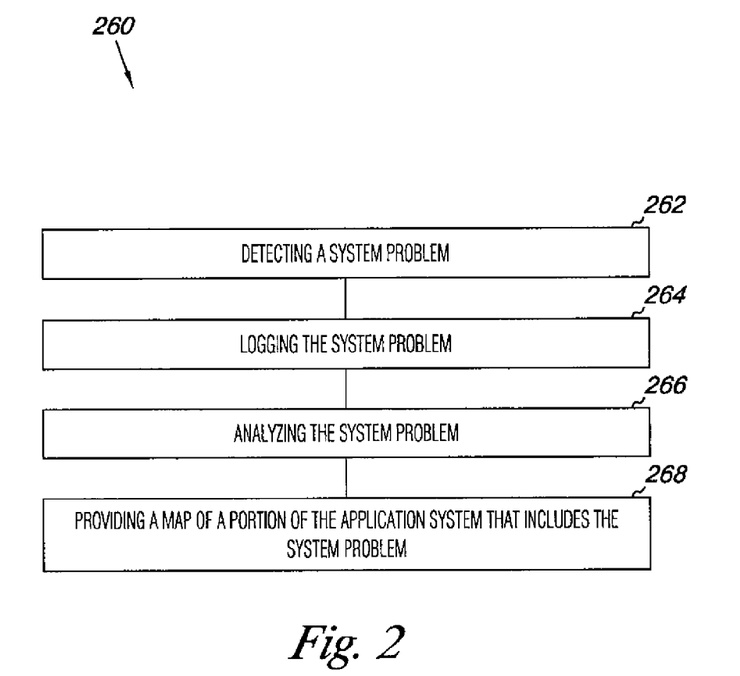
FIG. 2 illustrates a method of computing system monitoring according to an embodiment of the present disclosure.

Referring now to FIG. 2, a method 260 of computing system monitoring is illustrated. Embodiments of the present disclosure are not limited to the elements illustrated in FIG. 2. The method 260 includes detecting a system problem at block 262. Examples of the system problems that are detected include, but are not limited to, packet data transfer commands, packet data transfer errors, packet data volume, connection requests, connection denials, and error codes included in a packet. Element 262 can, for example, be performed by a detecting executable instructions functionality as described herein. Element 262 may, for example, detect a software problem, a hardware problem, and/or a firmware problem.

The method 260 includes logging the system problem at block 264. When a system problem is detected at block 262, the method 260 can, for example, proceed to logging the system problem at 264.

For example, in one or more embodiments, the detected system problem may be logged to a database. For one or more embodiments, the detected system problem may be logged to a memory, for instance, a random access memory.

The method 260 includes analyzing the system problem at block 266. System problems that have been detected at 262 and logged at 264 may be analyzed at 266 by an analyzing executable instructions functionality.

The analyzing executable instructions functionality may compare the detected and logged system problems to a predefined listing of system problems. An analyzing executable instructions functionality may, for example, identify which computing system components are affected by the detected and logged system problem.

In some embodiments, the analyzing executable instructions functionality may determine a location in computing system 100 where the one or more detected and logged system problems are occurring. The analyzing executable instructions for performing the function may be stored in a database, for example database 112 of FIG. 1.

Analyzing the system problem 266 may provide several items of information associated with the system problem, such as, but are not limited to, the name of the system problem, a short description of the system problem, a detailed description of the system problem, and/or a list of potential remedies for the system problem, charts, statistics, documentation. Analyzing the system problem 266 may provide, but are not limited to, contents of a file and/or an operation being processed when the system problem occurred, a sequence of events that led up to the system problem, a type of file and/or a type of operation being processed when the system problem occurred, a size of the file and/or a size of the operation being processed when the system problem occurred, charts, statistics, documentation a stack trace, and/or other such information or items.

The method 260 includes providing a map of a portion of the computing system that includes the system problem at block 268. As discussed herein, mapping executable instructions may be integrated, via an integrating executable instructions functionality, with another executable instructions and/or database.

For example, the integrating executable instructions functionality may integrate the mapping executable instructions functionality with the analyzing executable instructions functionality and/or a database. In some embodiments, the integrated mapping executable instructions functionality may provide the map of a portion of the computing system that includes the system problem, as at block 268. As discussed herein, the map may be provided via the GUI.

For one or more embodiments, Asynchronous JavaScript and Extensible Markup Language (XML), which may be referred to as AJAX, type functionality may be provided. However, it is not required that AJAX requests are asynchronous, nor is it required that XML is utilized. AJAX calls may be made at a predetermined time. The AJAX calls may be repeated. For example, AJAX calls may be made and repeated every 15 seconds, 30 seconds, 60 seconds, or 120 seconds. The AJAX calls may be made against system problems logged in a database. These system problems may then be indicated on a specific location on the map of a computing system. For one or more embodiments, only system problems that exceed a particular threshold will be displayed on the map of the computing system.

When the particular threshold is exceeded, the system problem may be indicated on the map of the computing system. Then, a user may select the indication of the system problem on the map of the computing system to be provided with additional information associated with the computing system, computing system components thereof, and/or the system problem. The additional information may include, but is not limited to, time, date, server information, an error message, stack trace, a Uniform Resource Locator (URL), a Member Number, an Employee Number, a channel, Internet Protocol (IP), a click trail history, potential and/or actual causes of the system problem, potential and/or actual remedies for the system problem, possible workaround solutions for the system problem, and/or contact information associated with a person or entity to be contacted regarding the system problem.

Figure 3:
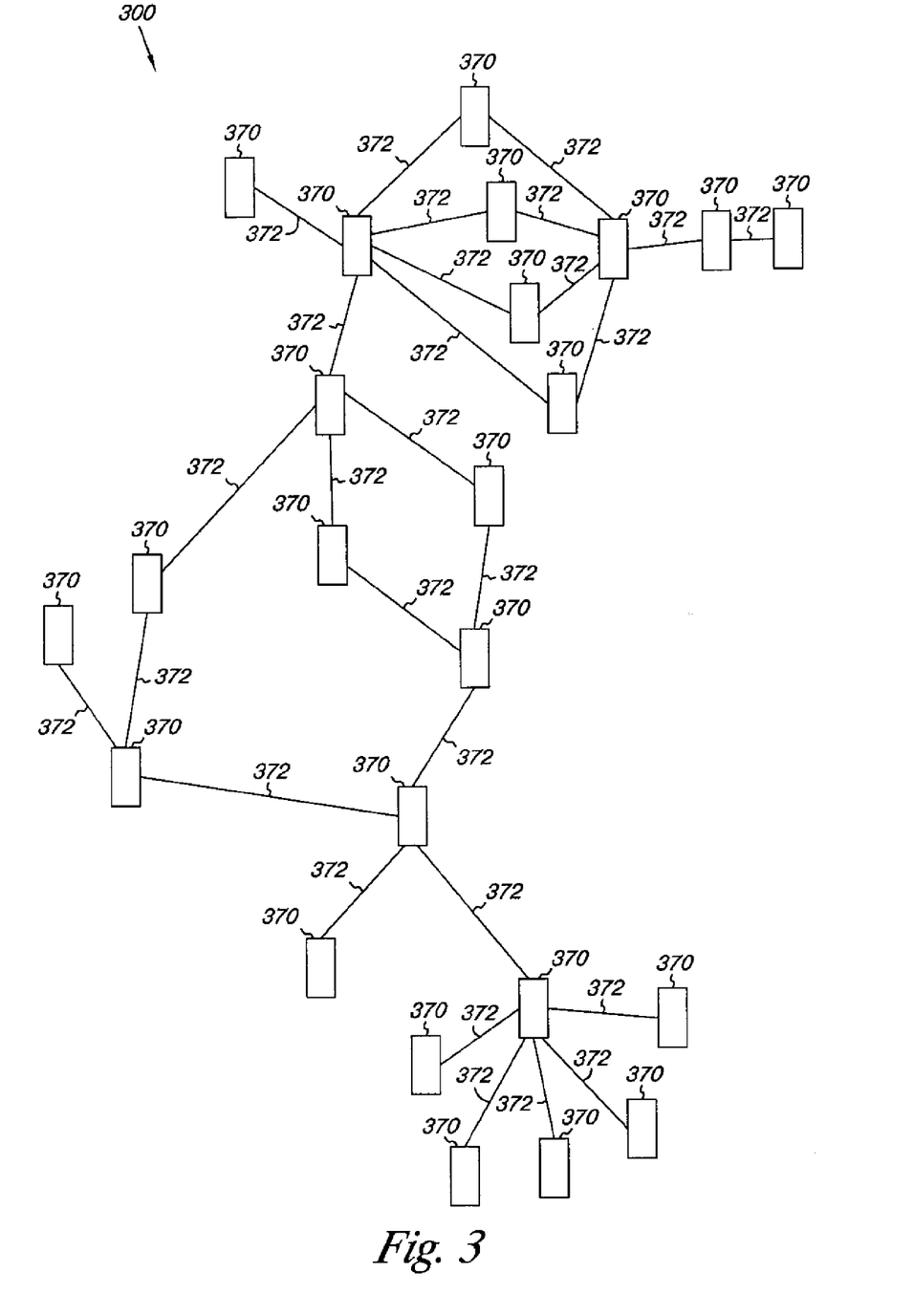
FIG. 3 illustrates an example of a two dimensional view of a portion of a computing system map according to an embodiment of the present disclosure.

FIG. 3 illustrates an example of a two dimensional view of a portion of computing system map according to an embodiment of the present disclosure. In the embodiment illustrated in FIG. 3, computing system 300 includes computing system components 370 and connections 372.

Figure 4:
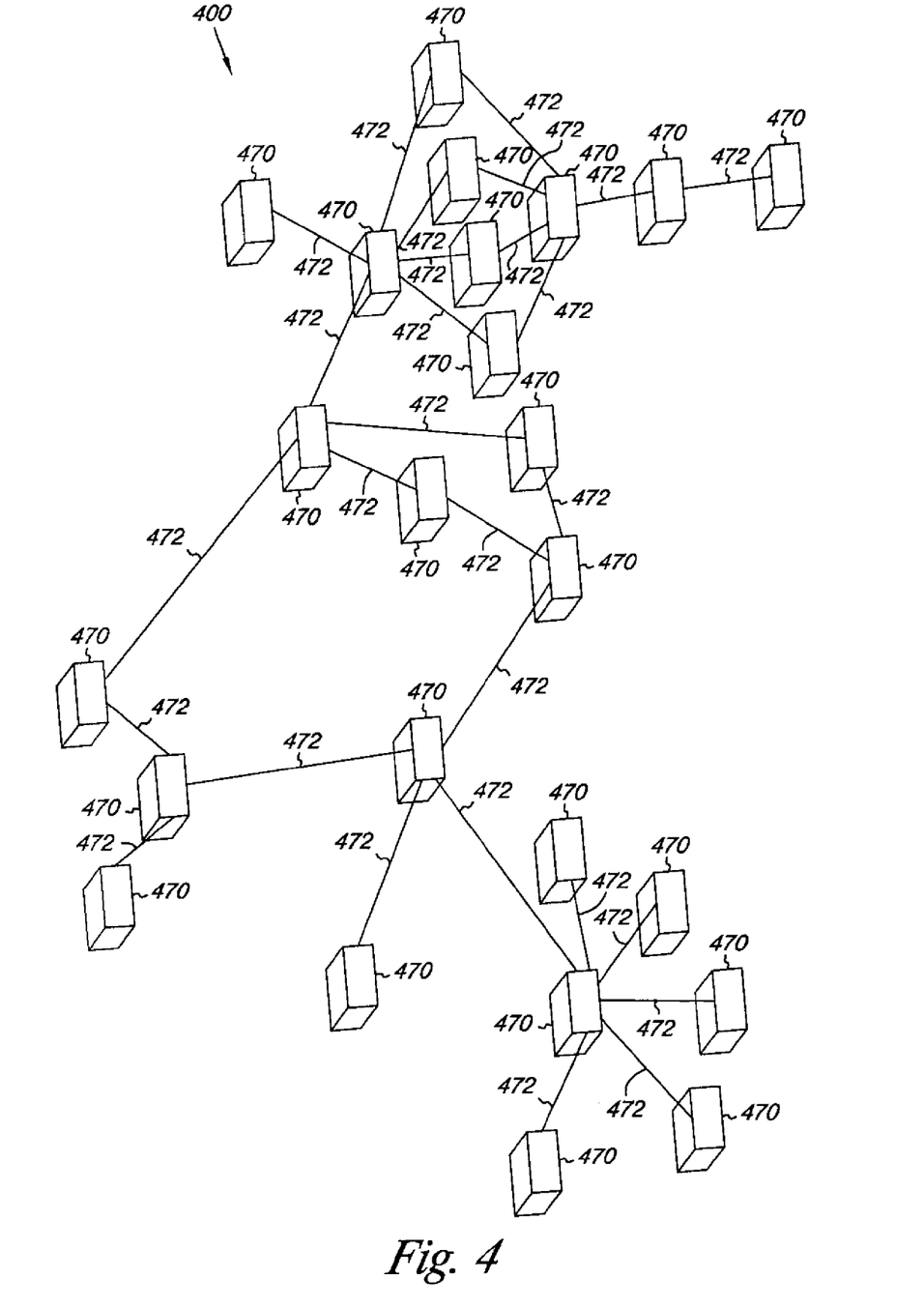
FIG. 4 illustrates an example of a three dimensional view of a portion of a computing system map according to an embodiment of the present disclosure.

Such illustrations as provided in FIGS. 3 and 4 may not show the physical orientation of the components of the system, but may show a depiction of the relationship of the components in a conceptual view, e.g., as a system administrator may view their relationship. In some embodiments, a diagram may be created by a system administrator or other individual via a GUI. In various embodiments, a diagram may automatically be created via executable instructions used to create the diagram or map from a configuration management database (CMDB) 112.

FIG. 4 illustrates an example of a three dimensional map of a portion of computing system according to an embodiment of the present disclosure. In the embodiment illustrated in FIG. 4, computing system 400 includes computing system components 470 and connections 472.

In some embodiments, the user, via a GUI, may be able to access both two and three dimensional views. In various embodiments, the map may reversibly switch from a two dimensional display to a three dimensional display.

Both the two dimensional map and the three dimensional map show information related to the computing system and/or computing system components thereof. For one or more embodiments, a portion of the information shown by the two dimensional map is the same as a portion of the information shown by the three dimensional map, while another portion of the information shown by the two dimensional map is different from the information shown by the three dimensional map, as discussed herein.

As one of ordinary skill in the art will appreciate, a computing device may include a processor in communication with a memory and may include electronic chips having hardware logic, e.g. application specific integrated circuits (ASICs), associated with one or more ports. Embodiments of the various computing devices are not limited to a number, type, or size of processor or memory resources.

Computer executable instructions may reside on the various computing devices. For example, computer executable instructions in the form of firmware and/or software may be resident on a network, e.g. network 118, in the memory of a network management station and/or one or more routers, hubs, and/or switches, and may be executable by the processor(s) and/or logic thereon. Also, computer executable instructions may be resident in a number of locations on various computing devices in the network as may be employed in a distributed computing network.

As used in this disclosure, a "distributed computing network" means the use of multiple computing devices in a network to execute various roles in executing instructions, as described herein. "Software", as used herein, may include a series of executable instructions that may be stored in memory and executed by the hardware logic of a processor (e.g., transistor gates) to perform a particular task. Memory, as the reader will appreciate, may include random access memory (RAM), read only memory (ROM), non-volatile memory (such as Flash memory), etc., which can store instructions executable on the processor and data to be used by the instructions.

Embodiments of the present disclosure may be performed by software, hardware in the form of logic, and/or applications, e.g. a self-contained hardware and/or software component that interacts with a larger system, on a computing system and/or system components thereof shown herein or otherwise known to those of ordinary skill in the art. A software application may come in the form of a file and handle a specific task within a larger software system.

A hardware application may be a separate set of logic, e.g. transistor/circuitry gates, that "plug-in" as a card, appliance, or otherwise, to a larger system/device. Embodiments, described herein, are not limited to a particular operating environment or to executable instructions composed in a particular programming language or syntax. Instructions suitable for carrying out embodiments of the present disclosure may be resident in one or more devices or locations.

For the present disclosure any suitable computer-usable or computer-readable medium may be utilized. Examples of the computer-usable or computer-readable medium include, but are not limited to, an electronic, magnetic, optical, electromagnetic, or semiconductor device.

More specific examples of the computer-readable medium include, but are not limited to, the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. A computer-usable or computer-readable medium may be any medium that contains, stores, communicates, or transports computer-executable instructions for use by or in connection with computing system 100.

The computer-readable medium may be transitory or the computer-readable medium may be non-transitory. The computer executable instructions may be transmitted using any appropriate medium, including but not limited to the Internet, wire line, optical fiber cable, RF, etc.

Computing devices and/or a computing system may include any or all of the following: a processor that executes and otherwise processes executable instructions; a plurality of input devices, which are operably coupled to the processor, for inputting information either via user input or from another system device; a graphical user interface (GUI) such as a display (e.g. an electronic cathode ray tub (CRT) or a liquid crystal display (LCD)), which is operably coupled to the processor, for displaying information; an imaging/printing device (e.g. an electronic printer or plotter), which is operably coupled to the processor, for printing images (e.g. textual or graphic information on paper), scanning visual images, and/or faxing visual images; a computer readable medium, which is operably coupled to the processor, for storing information; and various other suitable devices and/or electronic circuitry for performing other operations of the computing device known in the art.

What is claimed is:

1. A computer implemented method of computing system monitoring comprising using a computing device with a processor and a memory for storing executable instructions that are executable by the processor to perform:

detecting a system problem associated with a computing system;

logging the system problem to a database;

analyzing the system problem to determine a location of the system problem;

integrating the database and a mapping of executable instructions attributable to the system problem; and providing a map of at least a portion of the computing system via a graphical user interface, wherein the map is selected from the group consisting of raster maps and vector maps, and the map indicates the location of the system problem within the computing system.

2. The computer implemented method of claim 1, wherein the map zooms from a first level view to a second level view and provides additional information about the system problem.

3. The computer implemented method of claim 2, wherein the additional information includes a status indicator that indicates a computing system component of the computing system is functioning improperly.

4. The computer implemented method of claim 3, wherein the additional information includes a programming code level view of the computing system component of the computing system allowing a user to accomplish at least one of: reading a number of lines of the code attributable to the system problem and comparing one or more previous versions of that code.

5. The computer implemented method of claim 4, further comprising executable instructions that are executable by the processor to perform identifying a relationship between the first system problem and a second system problem.

6. The computer implemented method of claim 5, further comprising executable instructions that are executable by the processor to perform repeating an Asynchronous JavaScript and Extensible Markup Language call against the system problem logged to the database.

7. The computer implemented method of claim 6, further comprising executable instructions that are executable by the processor to perform providing a search function, wherein the search function identifies one or more computing system components of the computing system attributable to the system problem based upon the analyzing of the system problem.

8. A non-transitory computer readable medium storing computer executable code, wherein the computer executable code instructs a computer to perform:

detecting a system problem associated with a computing system;

logging the system problem to a database;

analyzing the system problem to determine a location of the system problem;

integrating the database and a mapping executable instructions;

indicating a status of the computer system, wherein the status indicates that the computer system is functioning properly or functioning improperly; and providing a map of a portion of the computing system as a graphical user interface, wherein the map is selected from the group consisting of raster maps and vector maps, and the map indicates the location of the system problem within the computing system.

9. The computer readable medium of claim 8, wherein the status indicator indicates a status with a heat map.

10. The computer readable medium of claim 9, wherein the heat map includes a first color that indicates a problem free status, a second color that indicates a status including a potential system problem, and a third color that indicates a status including a system problem.

11. The computer readable medium of claim 10, wherein the first color is green, the second color is yellow, and the third color is red.

12. The computer readable medium of claim 11, wherein the status indicator indicates a change in the computer system allowing a user to identify a portion of programming code that has changed in relation to a prior state of the portion of programming code.

13. The computer readable medium of claim 12, wherein the status indicator is updated in real time.

14. The computer readable medium of claim 13, wherein the status indicator provides an actual value of a parameter associated with computing system.

15. A system for computing system monitoring comprising:

a computing device with a processor and a memory for storing executable instructions that are executable by the processor to:

detect a system problem associated with a computing system;

log the system problem to a database;

analyze the system problem to determine a location of the system problem;

integrate the database and a mapping executable instructions; and provide a map of a portion of the computing system as a graphical user interface, wherein the map is selected from the group consisting of raster maps and vector maps, and the map indicates the location of the system problem within the computing system and the map zooms from a first level view to a second level view to provide additional information about the system problem.

16. The system of claim 15, wherein the additional information includes a computing system component that is a source of the system problem.

17. The system of claim 16, wherein the additional information includes programming code level information of the computing system component.

18. The system of claim 17, wherein the additional information indicates a section of programming code is responsible for the system problem.

19. The system of claim 18, the additional information includes a computer system connectivity that indicates which computer system components are affected by the system problem.

20. The system of claim 19, wherein the additional information is updated in real time.

* * * * *